(12) United States Patent
Singh et al.

(10) Patent No.: US 11,361,074 B2
(45) Date of Patent: *Jun. 14, 2022

(54) EFFICIENT SCANNING FOR THREAT DETECTION USING IN-DOC MARKERS

(71) Applicant: Netskope, Inc., Santa Clara, CA (US)

(72) Inventors: Abhinav Singh, Sunnyvale, CA (US); Himanshu Sharma, Milpitas, CA (US)

(73) Assignee: Netskope, Inc., Santa Clara, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/824,591

(22) Filed: Mar. 19, 2020

(65) Prior Publication Data
US 2021/0056204 A1 Feb. 25, 2021

Related U.S. Application Data

(63) Continuation of application No. 16/556,183, filed on Aug. 29, 2019, now Pat. No. 10,621,346.
(Continued)

(51) Int. Cl.
*G06F 21/56* (2013.01)
*H04L 9/40* (2022.01)
(Continued)

(52) U.S. Cl.
CPC .......... *G06F 21/565* (2013.01); *G06F 21/577* (2013.01); *H04L 9/3239* (2013.01); *H04L 63/145* (2013.01); *G06F 2221/034* (2013.01)

(58) Field of Classification Search
CPC ............... G06F 21/565; G06F 21/577; G06F 2221/034; G06F 21/562; G06F 21/566;
(Continued)

(56) References Cited

U.S. PATENT DOCUMENTS

| 8,806,641 | B1 | 8/2014 | Li et al. |
| 10,621,346 | B1 * | 4/2020 | Singh ................ H04L 9/3239 |

(Continued)

FOREIGN PATENT DOCUMENTS

EP 2544117 A1 1/2013

OTHER PUBLICATIONS

Smutz et al.; "Malicious PDF Detection using Metadata and Structural Features", Dec. 2012, ACM, pp. 239-248. (Year: 2012).*
(Continued)

*Primary Examiner* — Matthew Smithers
(74) *Attorney, Agent, or Firm* — Haynes Beffel & Wolfeld LLP; Ernest J. Beffel, Jr.

(57) ABSTRACT

The disclosed technology teaches reducing threat detection processing, including recognizing that a file is an edited version of a previously processed file and retrieving, from an archive, metadata values, hashes for property groups and an entropy measure of the previously processed file. Also included is parsing the file into metadata values and property groups and calculating hashes of the property groups and entropy measure for the file. The method further includes applying similarity measures to compare the metadata values, the entropy measures, and the hashes on the property groups, for the edited version and the previously processed file. When any similarity measure or combination of similarity measures reaches a trigger, the technology teaches processing the file by using a threat detection module to detect malware. Property groups include core properties, application properties, document content and programming scripts for the edited version of the file and the previously processed file.

22 Claims, 11 Drawing Sheets

Related U.S. Application Data

(60) Provisional application No. 62/890,034, filed on Aug. 21, 2019.

(51) Int. Cl.
*G06F 21/57* (2013.01)
*H04L 9/32* (2006.01)

(58) Field of Classification Search
CPC . H04L 63/145; H04L 9/3239; H04L 63/1416; H04L 9/0891; H04L 9/0643; H04L 9/0894
See application file for complete search history.

(56) References Cited

U.S. PATENT DOCUMENTS

| | | | |
|---|---|---|---|
| 10,853,058 B1 * | 12/2020 | Ouzan | G06F 21/51 |
| 2009/0300761 A1 | 12/2009 | Park et al. | |
| 2014/0007222 A1 | 1/2014 | Qureshi et al. | |
| 2015/0135262 A1 | 5/2015 | Porat et al. | |
| 2018/0048658 A1 | 2/2018 | Hittel et al. | |
| 2018/0139216 A1 | 5/2018 | Rasanen et al. | |
| 2019/0228153 A1 | 7/2019 | Scaife et al. | |
| 2019/0230098 A1 | 7/2019 | Navarro | |
| 2019/0236273 A1 * | 8/2019 | Saxe | G06N 3/0454 |
| 2019/0311134 A1 | 10/2019 | Mahaffey et al. | |
| 2020/0120107 A1 * | 4/2020 | McGrew | H04L 63/126 |
| 2021/0044604 A1 * | 2/2021 | Annen | G06F 21/565 |

OTHER PUBLICATIONS

Haapala-etal_- "Python Extension for Computing String Edit Distances and Similarities", Python-Levenshtein 0.12.0, https://pypi.org/project/python-Levenshtein/, Apr. 3, 2019, 6pages.
"Secure Hashes and Message Digests", 14.1 hashlib, https://docs.python.org/2/library/hashlib.html, Apr. 3, 2019, 4 pages.
"Fuzzy Hashing Program", ssdeep-ssdeep Project, https://ssdeep-project.github.io/ssdeep/index.html#docs, 2017, 3 pages.
"Shannon Entropy", https://en.wiktionary.org/wiki/Shannon_entropy, Aug. 28, 2019, 1 page.
"MD5 Wikipedia", MD5 message-digest algorithm, https://en.wikipedia.org/wiki/MD5, Aug. 26, 2019, 11 pages.
"Netskope Introspection," netSkope, Inc., 2015, 3 pgs.
Netskope, "Data Loss Prevention and Monitoring in the Cloud", Nov. 2014, 18 pages.
Netskope, "Cloud Data Loss Prevention Reference Architecture", 2015, 2 pages.
Netskope, "The 5 Steps to Cloud Confidence", 2014, 11 pages.
Netskope, Inc., "The Netskope Active Platform Enabling Safe Migration to the Cloud," 2015, pp. 1-6.
Netskope, Inc., "The Netskope Advantage: Three 'Must-Have' Requirements for Cloud Access Security Brokers," 2015, pp. 1-4.
Netskope, Inc., "The 15 Critical CASB Use Cases," 2016, pp. 1-19.
Netskope, Inc., "Netskope ActiveTM Cloud DLP," 2015, pp. 1-5.
Netskope, Inc., "Repave the Cloud-Data Breach Collision Course," 2014, pp. 1-6.
Netskope, Inc., "Netskope Cloud Confidence IndexTM," 2015, pp. 1-4.
Richardson et al., RESTful Web APIs, published by O'Reilly Media, Inc., Sep. 10, 2013, ISBN: 978-1-449-35806-8, 403 pages.

* cited by examiner

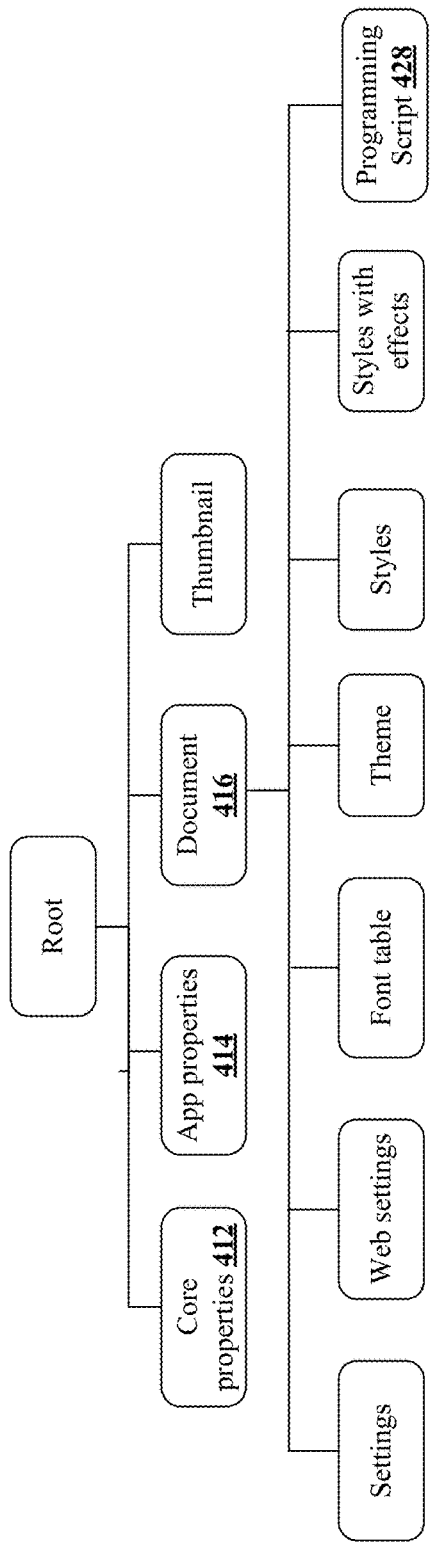
FIG. 4A (DOM PRIOR ART)
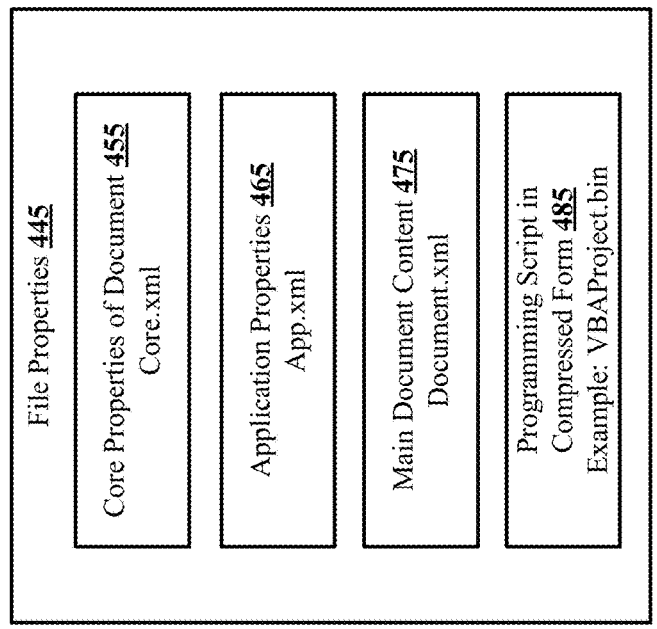
FIG. 4B

```
{'app_properties': {'application': ['Microsoft Office Word', 'Microsoft Office Word', 'Microsoft Office Word'],  502
  'appversion': ['16.0000', '16.0000', '16.0000'],  522
  'characters': [2828, 2841, 184851],
  'characterswithspaces': [3317, 3331, 216847],
  'company': ['Netskope', 'Netskope', 'Unknown'],
  'docsecurity': [0, 0, 0],
  'headingpairs': ['None', 'None', 'None'],
  'i4': [1, 1, 1],
  'lines': [23, 24, 1540],
  'pages': [1, 1, 5],
  'paragraphs': [6, 7, 433],
  'shareddoc': ['false', 'false', 'True'],
  'template': ['Normal.dotm', 'Normal.dotm', 'Normal.dotm'],
  'totaltime': [691, 441, 694],
  'words': [495, 501, 32429]},
 'core_properties': {'coreproperties': ['None', 'None', 'None'],
  'created': ['2019-02-19T21:10:00Z', '2019-02-19T21:10:00Z', '2019-02-19T21:10:00Z'],  532
  'creator': ['Darkl0rd', 'Darkl0rd', 'Darkl0rd'],
  'description': ['Test Doc', 'Test Doc', 'Test Doc'],
  'lastmodifiedby': ['Abhinav Singh', 'Himanshu Sharma', 'Unknown'],
  'modified': [b'2019-04-09T15:35:00Z', b'2019-04-34T15:35:00Z', b'2019-05-09T15:35:00Z'],
  'revision': [0, 27, 32],
  'subject': ['None', 'None', 'Testing the Doc changes'],
  'title': ['Test', 'Test Doc', 'Test Doc']},
 'document_properties': {'document': ['None', 'None', 'None'],
  'rpr': ['None', 'None', 'None'],
  'hyperlink': {
   'edit1': ['http://netskope.com', 'https://www.twitter.com/abhinavbom', 'https://www.twitter.com/abhinavbom'],
   'edit2': ['http://netskope.com', 'https://www.twitter.com/abhinavbom', 'https://www.twitter.com/abhinavbom'],
   'edit3': ['http://netskope.com', 'https://www.twitter.com/abhinavbom', 'https://www.google.com']
  },
}
```

FIG. 5

```
'instrtext': ['HYPERLINK"https://en.wikipedia.org/wiki/Morgoth", "\o "Morgoth" ', 'HYPERLINK "https://en.wikipedia.org/wiki/Dark_Lord"']
  'relationships': [None', 'None', 'None'],
  'pgmar': ['None', 'None', 'None'],
  'pgsz': ['None', 'None', 'None'],
  'ppr': ['None', 'None', 'None']},
'file_property_changes': {'entropy_changes': {'entropy_values': [6.110357797397489, 6.130467311655, 6.17433478876O4],
                          'percentage_entropy_change': [0, 0.32, 0.66]},  ──612
  'filename_changes': {'filenames': ['testfile_20190101.docx', 'testfile_20190102.docx', 'testfile_20190104.docx'],
                       'similarity_score': [0, 95.4, 95.4]},  ──622
  'filename_ext_changes': {'extensions': ['.docx', '.docx', '.docx'],
                           'similarity_score': [0, 100.0, 100.0]},  ──632
  'filesize_changes': {'percent_change': [0, 0.6, 92.2]},  ──642
                        'size': [14041, 14133, 27173]}},
  'last_scanned': '2019-04-24',
  'simhash_changes': {}},
'flash_objects': [False', 'False', 'False'],
'objectpool': ['False', 'False', 'False'],
'section_simhash_changes': {'app.xml': {'simhash_changes': {'simhash': [
  '24:2dtz6fl4xflKJmEgb6+iqDwGFZo6rZda+a0xctkLS9flkBej4quPy/ib:csN4xNKJVg/iqt9Zg+fOtkuqkUo',
  '24:2dtz6fl4xflKJm+Mgb6+iqDwGFZo6rZda+a0xctkLS9flkBej4quPy/ib:csN4xNKJ7Mg/iqt9Zg+fOtkuqkUo',
  '24:2dtz6fl4xflKJm+nzG6liqDzGldo6rZda+a0xctkLS9flkBej4Py/ib:csN4xNKJ7nzRiqg9Zg+fOtkuqkUI'],
  'similarity_score': [0, 99, 86]}},  ──652
  'core.xml': {'simhash_changes': {'simhash': [
  '12:TMHdt2rmflknYgRN8i9fj1YoXq1WwWSrUTV+/HUcED:2dtpflknYgz8foXqE7+AD',
  '12:TMHdt2rmflknYgRN8i9fj1YoXq1WwWSrUx/HUc3y:2dtpflknYgz8foXqE7bjy',
  '12:TMHdt2rmflknYgRN8i9fj1YoXq1WwWSrU5/HUc6W:2dtpflknYgz8foX4D1v+W'],
  'similarity_score': [0, 91, 86]}},  ──662
  'document.xml': {'simhash_changes': {'simhash': [
  '96:vmlAKAzHLCswiZS6mmY+bzZIiSwXi/iZobIKw+UHLWiH/jSHMws+1bWT5F61kr4m:sgmmY+ZsqqeKbLe3vpmSkyCD7Y3jj0',
  '96:vmlAKAzHLCswiZS6mmY+bzZIiSwXi/iZobIKw+UHLWiH/jSHMws+1bWT5F61kr4Z:sgmmY+ZsqqeKbLe3vpmSkyCD7Y3jjH',
  '12288:JEVGDZtQ3GRyzw1W/b+D8j2vW9AhJQPkWzzcZyKRm5d+1P+19CN+sLIJ+fSJ3Gux:JEVGDZtQ3GRyzw1W/b+D8j2vW9AhJQPy'],
  'similarity_score': [0, 91, 0]}},  ──672
'vbaProject.bin': {}},
'vba_macros': False}
```

FIG. 6

...'document_properties': {'document': [None, None, None],
'rpr': [None, None, None],
'hyperlink': {
    'edit1': ['http://netskope.com', 'https://www.twitter.com/abhinavbom'],
    'edit2': ['http://netskope.com', 'https://www.twitter.com/abhinavbom'],
    'edit3': ['http://netskope.com', 'https://www.twitter.com/abhinavbom', 'https://www.google.com']},
'instrtext': ['HYPERLINK"'https://en.wikipedia.org/wiki/Morgoth", "\o "Morgoth"", ' HYPERLINK "https://en.wikipedia.org/wiki/Dark_Lord"']}

...
'file_property_changes': {'entropy_changes': {'entropy_values': [7.310357979397489, 7.311835124894788, 7.314835124894788],
        'percentage_entropy_change': [0, 0.13679890560876437, 0.0410295686424468]},
    'filename_changes': {'filenames': [testfile_20190101.docx', 'testfile_20190102.docx', 'testfile_20190103.docx'],
        'similarity_score': [0, 95.45454545454545, 95.45454545454545]},
    'filename_ext_changes': {'extensions': ['.docx', '.docx', '.docx'],
        'similarity_score': [0, 100.0, 100.0]},
    'filesize_changes': {'percent_change': [0, 0.6, 1.2],
        'size': [14041, 14133, 14311]},
    'last_scanned': '2019-04-24',
    'simhash_changes': {}}, 'section_simhash_changes': {'app.xml': {'simhash_changes': {'simhash': [
'24:2dtz6fl4xflKJmEgb6+iqDwGFZo6rZda+a0xctkLS9flkBej4quPy/ib:csN4xNKJVg/iqt9Zg+fOtkuqkUo',
'24:2dtz6fl4xflKJm+Mgb6+iqDwGFZo6rZda+a0xctkLS9flkBej4quPy/ib:csN4xNKJ7Mg/iqt9Zg+fOtkuqkUo',
'24:2dtz6fl4xflKJmJge6JDiqDwGFZo6rZda+a0xctkLS9flkBej4ZPy/ib:csN4xNKJogNDiqt9Zg+fOtkuqkU+'],
        'similarity_score': [0, 99, 91]}},          756
    'core.xml': {'simhash_changes': {'simhash': [
'12:TMHdt2rmf1knYgRN8i9fj1YoXq1WwWSrUTV+/HUceED-2dtpf1knYgz8foXqE7+AD',
'12:TMHdt2rmf1knYgRN8i9fj1YoXq1WwWSrUx/HUc3y-2dtpf1knYgz8foXqE7bjy',
'12:TMHdt2rmf1knYgRN8i9fj1YoXq1WwWSrU9/HR-2dtpf1knYgz8foXqE7f5'],
        'similarity_score': [0, 91, 93]}},
    'document.xml': {'simhash_changes': {'simhash': [
'96:vm1AKAzHLCswiZS6mmY+bzZliSwXi/iZobIKw+UHLWiH/jSHMws+1bWT5F61kr4m:sgmmY+ZsqqeKbLe3vpmSkyCD7Y3jj0',
'96:vm1AKAzHLCswiZS6mmY+bzZliSwXi/iZobIKw+UHLWiH/jSHMws+1bWT5F61kr4Z:sgmmY+ZsqqeKbLe3vpmSkyCD7Y3jjH',
'96:vm1AKAzHLCswiZS6mmY+bzZliSwXi/iZobIKw/UML/is/jSH8wsF1+WT5F61kr4+:sgmmY+ZsOGeKbLewvpmSkyu87Ynjjg'],
    'vbaProject.bin': {'simhash_changes': {'simhash': ['',
        '6:TMVBd6OjzmC3mUifmReUdzXxjmUA+DYQXzReYX9v48sEJ:TMHdtWa6fmEUdzXV4+DYQDEEQWJ'],
        'similarity_score': [0, 100, 0]}}},          776

'vba_macros': ['False','False', 'True'] }          782   FIG. 7

```
...
'file_property_changes': {'entropy_changes': {'entropy_values': [6.11035797397489, 6.13046731]1655, 7.81483512489478]},
                                               824                    836
                          'percentage_entropy_change': [0, 0.32, 27.40]},
   'filename_changes': {'filenames': [['testfile_20190101.docx', 'testfile_20190102.docx', 'testfile_20190103.docx.crypt'],
                        'similarity_score': [0, 95.4, 84.0]},
                                                                845
   'filename_ext_changes': {'extensions': [['.docx', '.docx', '.docx.crypt'],
                            'similarity_score': [0, 100.0, 57.14285714285714]}},
   'filesize_changes': {'percent_change': [0, 0.6, 1.2],
                                                      864
                        'size': [14041, 14133, 14311]},
   'last_scanned': '2019-04-24',
   'simhash_changes': {}},
```

FIG. 8A

```
...
'document_properties': {'document': ['None', 'None', 'None'],
   'rpr': ['None', 'None', 'None'],
   'pgmar': ['None', 'None', 'None'],
   'hyperlink': {
       'edit1': ['http://netskope.com', 'https://www.twitter.com/abhinavbom'],
       'edit2': ['http://netskope.com', 'https://www.twitter.com/abhinavbom'],
       'edit3': ['http://netskope.com', 'https://www.twitter.com/abhinavbom', 'https://www.bankloginforyou.com']
   },
   'instrtext': ['HYPERLINK "https://en.wikipedia.org/wiki/Morgoth" , "\\o "Morgoth" ' , ' HYPERLINK "https://en.wikipedia.org/wiki/
Dark_Lord"']                                                                                                              878
},
'file_property_changes': {'entropy_changes': {'entropy_values': [6.11035797397489, 6.13046731111655, 6.15433478876604],
                                                                                                           886
                          'percentage_entropy_change': [0, 0.32, 0.33]},
   'filename_changes': {'filenames': [['testfile_20190101.docx', 'testfile_20190102.docx', 'complete_document.docx'],
                        'similarity_score': [0, 95.4, 40.90]},
   'filename_ext_changes': {'extensions': [['.docx', '.docx', '.docx'],
                            'similarity_score': [0, 100.0, 100.0]},
   'filesize_changes': {'percent_change': [0, 0.6, 1.2],
                        'size': [14041, 14133, 14311]},
   'last_scanned': '2019-04-24',
   'simhash_changes': {}
```

FIG. 8B

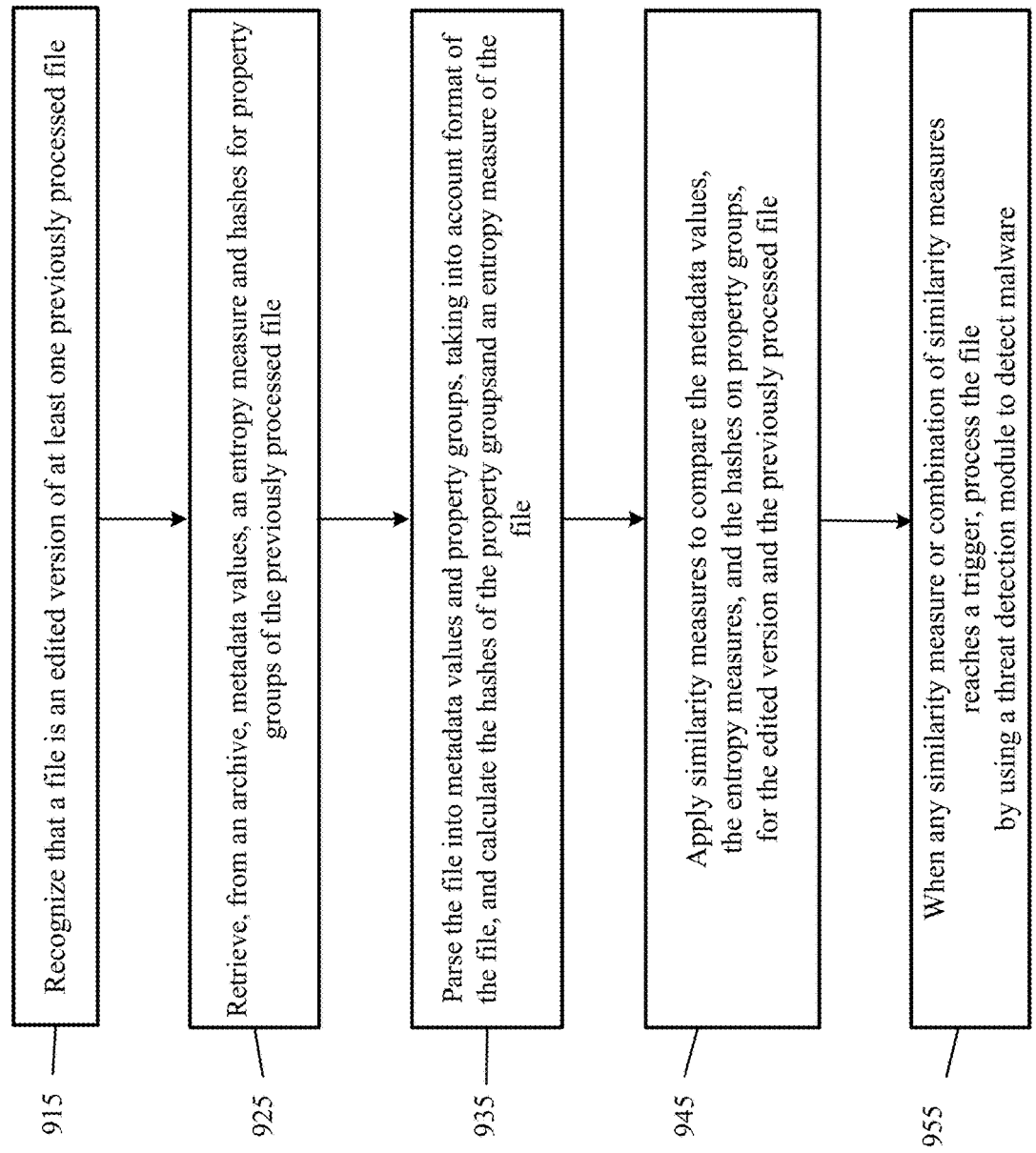

EFFICIENT SCANNING FOR THREAT DETECTION USING IN-DOC MARKERS

PRIORITY DATA

This application is a continuation of U.S. patent application Ser. No. 16/556,183, entitled ""EFFICIENT SCANNING FOR THREAT DETECTION USING IN-DOC MARKERS", filed on Aug. 29, 2019, which is related to and claims the benefit of U.S. Provisional Patent Application No. 62/890,034, entitled, "EFFICIENT SCANNING FOR THREAT DETECTION USING IN-DOC MARKERS", filed on Aug. 21, 2019. The priority non-provisional and provisional applications are hereby incorporated by reference for all purposes.

INCORPORATIONS

The following materials are incorporated by reference in this filing:

U.S. Nonprovisional application Ser. No. 15/213,250, entitled "LOGGING AND MONITORING USAGE OF CLOUD-BASED HOSTED STORAGE SERVICES," filed on 18 Jul. 2016 (now U.S. Pat. No. 9,998,496, issued on Jun. 12, 2018), which is a continuation of U.S. Nonprovisional application Ser. No. 14/198,499, entitled "SECURITY FOR NETWORK DELIVERED SERVICES," filed on 5 Mar. 2014 (now U.S. Pat. No. 9,398, 102, issued on Jul. 19, 2016), which claims the benefit of U.S. provisional Patent Application No. 61/773,633, entitled, "SECURITY FOR NETWORK DELIVERED SERVICES," filed on Mar. 6, 15 2013;

U.S. Nonprovisional application Ser. No. 14/198,508, entitled "SECURITY FOR NETWORK DELIVERED SERVICES", filed on Mar. 5, 2014 (now U.S. Pat. No. 9,270,765, issued Feb. 23, 2016);

U.S. Nonprovisional application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015 (now U.S. Pat. No. 9,928,377, issued on Mar. 27, 2018);

U.S. Nonprovisional application Ser. No. 15/368,246, entitled "MIDDLE WARE SECURITY LAYER FOR CLOUD COMPUTING SERVICES", filed on Dec. 2, 2016, which claims the benefit of U.S. Provisional Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016;

U.S. Nonprovisional application Ser. No. 16/408,215, entitled "SMALL-FOOTPRINT ENDPOINT DATA LOSS PREVENTION (DLP)", filed on May 9, 2019, a continuation-in-part of U.S. Nonprovisional patent application Ser. No. 16/000,132, entitled "METADATA-BASED DATA LOSS PREVENTION (DLP) FOR CLOUD STORAGE", filed on Jun. 5, 2018 (now U.S. Pat. No. 10,291,657 issued on May 14, 2019), which application claims the benefit of U.S. Provisional Patent Application No. 62/675,692, entitled "SMALL-FOOTPRINT ENDPOINT DATA LOSS PREVENTION (DLP)", filed on May 23, 2018;

U.S. application Ser. No. 16/408,215 also is a continuation of U.S. Nonprovisional patent application Ser. No. 15/368,240, entitled "SYSTEMS AND METHODS OF ENFORCING MULTI-PART POLICIES ON DATA-DEFICIENT TRANSACTIONS OF CLOUD COMPUTING SERVICES", filed on Dec. 2, 2016, which application claims the benefit of U.S. Provisional Patent Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016.

"Cloud Security for Dummies, Netskope Special Edition" by Cheng, Ithal, Narayanaswamy, and Malmskog, John Wiley & Sons, Inc. 2015, "Netskope Introspection" by Netskope, Inc., "Data Loss Prevention and Monitoring in the Cloud" by Netskope, Inc., "Cloud Data Loss Prevention Reference Architecture" by Netskope, Inc., "The 5 Steps to Cloud Confidence" by Netskope, Inc., "The Netskope Active Platform Enabling Safe Migration to the Cloud" by Netskope, Inc.

"The Netskope Advantage: Three "Must-Have" Requirements for Cloud Access Security Brokers" by Netskope, Inc., "The 15 Critical CASB Use Cases" by Netskope, Inc.

"Netskope Active™ Cloud DLP" by Netskope, Inc.,

"Repave the Cloud-Data Breach Collision Course" by Netskope, Inc.; and

"Netskope Cloud Confidence Index™" by Netskope, Inc.

which are incorporated by reference for all purposes as if fully set forth herein.

FIELD OF THE TECHNOLOGY DISCLOSED

The technology disclosed relates generally to providing security for network delivered services via threat detection and in particular relates to efficient threat scanning using in-document markers, for reducing latency while applying security services in the cloud.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Businesses depend on computing systems to survive, and cloud customers operate in an environment that spans geographies, networks and systems. The use of cloud services for corporate functionality is common. According to International Data Corporation, almost half of all information technology (IT) spending will be cloud-based in 2018, "reaching 60% of all IT infrastructures and 60-70% of all software, services and technology spending by 2020." Data is the lifeblood of the businesses and must be effectively managed and protected. With the increased adoption of cloud services, companies of all sizes are relying on the cloud to create, edit and store data. This presents new challenges as users access cloud services from multiple devices and share data, including with people outside of an organization. It is easy for data to get out of an organization's control.

Enterprise companies utilize software as a service (SaaS) solutions instead of installing servers within the corporate network to deliver services. The providers of the solutions offer a service level agreement (SLA), between a service and a customer, which sets the expectations of assured availability, performance, security and privacy of the customer's data. In turn, the customers expect to be able to collaboratively create, edit and save their data securely among multiple customer branches and data centers.

There are many ways data can be compromised as the number of data sources increases, including malware software which has a malicious intent or secretly acts against the interest of the user, often with malicious links that lead to unintended access to data.

An opportunity arises to improve file scan efficiency and threat detection efficacy by as much as ten to twelve percent, with a resulting potential consequence of cost and time savings in the security systems utilized by customers who use SaaS.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4A shows an example document object model (DOM) tree structure with various properties accessible for a file.

FIG. 4B shows an example of file property groups for a file, with core properties, application properties, document content, and programming scripts.

FIG. 5 lists example metadata values usable for analyzing the similarity between properties of the edited version of a document file and the previously processed file, with features and property groups that represent the file.

FIG. 6 lists the second portion of the example metadata of FIG. 5, with additional document metadata values and similarity hash changes for the file.

FIG. 7 shows an example of analysis results of property groups for a scenario in which a macro has been added to the edited version of the file that was not present in the previously processed files.

FIG. 8A shows a snippet of analysis results for an example in which threat protection service determines that there has been a change in a file's extension and captures the anomaly, so the file gets routed for full threat scanning.

FIG. 8B shows another snippet of analysis results for an added URL to the last of a series of saves for a file.

FIG. 9 illustrates a representative method of reducing threat protection processing.

DETAILED DESCRIPTION

Figure 1A:
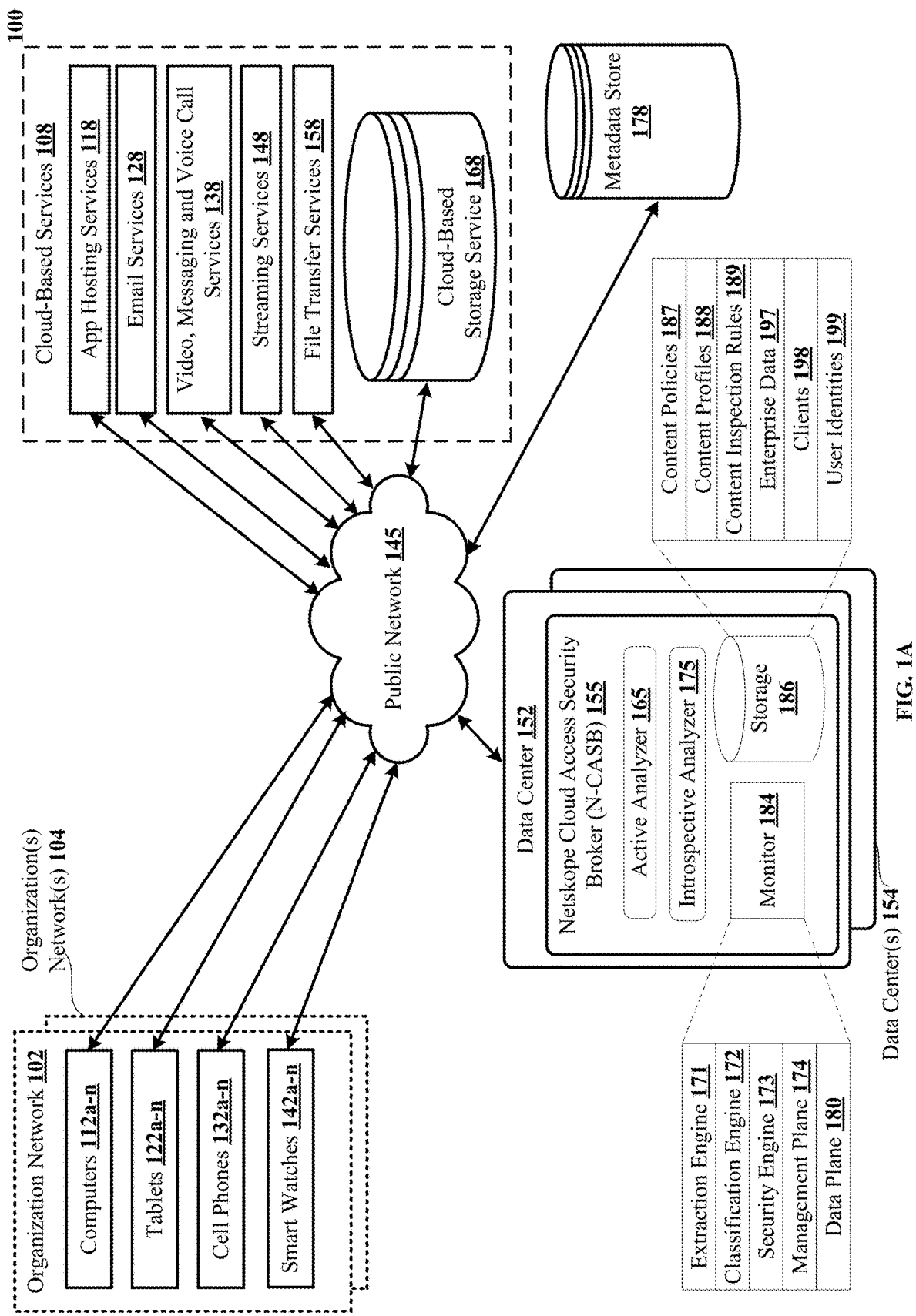
FIG. 1A illustrates an architectural level schematic of a system for reducing security threat detection overhead.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The cloud and web make it easy for users to collaborate and share documents, but these same capabilities make the cloud an attractive target for attackers trying to spread malware and carry out other malicious activity. Enterprise companies utilize SaaS solutions to deliver services, and customers expect their data to be stored securely in the cloud environment. SaaS solutions offer many business applications, including office software for documents, presentations, worksheets, databases, charts, graphs, digital paintings, electronic music and digital video; messaging software, payroll processing software, DBMS software, management software, CAD software, development software, gamification, virtualization, accounting, collaboration, customer relationship management (CRM), Management Information Systems (MIS), enterprise resource planning (ERP), invoicing, human resource management (HRM), talent acquisition, learning management systems, content management (CM), Geographic Information Systems (GIS), and service desk management. For example, customers regularly create, edit and save files via Microsoft Office 365 and Google Apps, among others, in a cloud environment. A service level agreement (SLA) between a service provider and a customer offers an expected level of availability, performance, security and privacy of the customer's data.

The disclosed technology improves a Netskope cloud access security broker (N-CASB) system of comprehensive threat protection for network delivered cloud and web services, optimizing the threat scanning process by scanning a file once and re-scanning its edits only if the new changes reach a configurable threshold value. The system being improved is described by this invention: U.S. application Ser. No. 15/213,250, entitled "LOGGING AND MONITORING USAGE OF CLOUD-BASED HOSTED STORAGE SERVICES," filed on 18 Jul. 2016, which is a continuation of U.S. application Ser. No. 14/198,499, entitled "SECURITY FOR NETWORK DELIVERED SERVICES," filed on 5 Mar. 2014, which claims the benefit of U.S. provisional Patent Application No. 61/773,633, entitled, "SECURITY FOR NETWORK DELIVERED SERVICES," filed on Mar. 6, 15 2013 (now U.S. Pat. No. 9,998,496, issued on Jun. 12, 2018).

A SaaS application generates a new file identifier as soon as a new file is created and the file identifier (file ID) value remains constant throughout the creation, edit and storage cycles for a single document edited in the same SaaS application, as long as the file exists in the application. The file ID does not change even when the file is edited.

When a file is edited and saved, the N-CASB generates a new unique file hash and associates the file hash with the resultant file. In a cloud environment the rate of change in documents is high, with files typically edited continuously, which changes the file hashes every time a save of the file occurs. The generation of a unique file-hash every time a file gets saved results in a one-to-many mapping in cases in which the same file is edited multiple times. Having the many similar files leads to repetitive security threat scanning of similar files that are slightly modified, which introduces efficiency issues and also false positive issues in which a false positive (FP) identification as a threat for one version of the file causes repetitive FPs every time the file is edited and rescanned.

Current file traffic levels include the receipt of as many as ten million files per day that need to be secure, and this level is projected to expand to thirty million files per day in the near future. Measurement of the impact of files being scanned by the existing N-CASB led to disclosed technology that improves scan efficiency and threat detection efficacy. In an analysis of production data, researchers learned that only 200,000 unique file IDs were associated with 1.5 million of the hashes in a set of 13 million files. The disclosed technology saves the security system from rescanning these 1.5 million files on a selective basis. In one example, a single call center spreadsheet represented 9,023 entries for a single file ID. A calculation of the mean number of files associated with a single file ID showed that on average a single file was associated with 6.7 file IDs due in part to filename changes by customers. A ten to twelve percent improvement in the number of files to be scanned is predicted for the measured data set, and even more improvement is anticipated for larger production data sets of SaaS documents.

The disclosed technology for reducing threat detection overhead offers a security services platform that utilizes fewer resources than existing systems, to administer customized security services and policies for organizations. The disclosed technology improves scanning efficiency by avoiding repeated rescanning of documents getting edited in the cloud, and the solution works generically across a wide range of applications. An example system for reducing threat detection processing is described next.

Architecture

FIG. 1A shows an architectural level schematic of a system 100 for reducing security threat detection overhead. Because FIG. 1A is an architectural diagram, certain details are intentionally omitted to improve clarity of the description. The discussion of FIG. 1A will be organized as follows. First, the elements of the figure will be described, followed by their interconnections. Then, the use of the elements in the system will be described in greater detail.

System 100 includes organization network 102, data center 152 with Netskope cloud access security broker (N-CASB) 155 and cloud-based services 108. System 100 includes multiple organization networks 104 for multiple subscribers, also referred to as multi-tenant networks, of a security services provider and multiple data centers 154, which are sometimes referred to as branches. Organization network 102 includes computers 112a-n, tablets 122a-n, cell phones 132a-n and smart watches 142a-n. In another organization network, organization users may utilize additional devices. Cloud services 108 includes cloud-based hosting services 118, web email services 128, video, messaging and voice call services 138, streaming services 148, file transfer services 158, and cloud-based storage service 168. Data center 152 connects to organization network 102 and cloud-based services 108 via public network 145.

Continuing with the description of FIG. 1A, disclosed enhanced Netskope cloud access security broker (N-CASB) 155 calculates similarity measures for files and determines whether a file needs to be scanned, securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats. N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office 365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data.

Continuing further with the description of FIG. 1A, N-CASB 155 further includes monitor 184 that includes extraction engine 171, classification engine 172, security engine 173, management plane 174 and data plane 180. Also included in N-CASB 155, storage 186 includes content policies 187, content profiles 188, content inspection rules 189, enterprise data 197, information for clients 198 and user identities 199. Content profiles 188 can include SaaS application and file metadata values associated with a file with a file ID and a series of files with the same file ID and different file hashes, including word count, character count, paragraph count, author, etc. as well as a deep hash of each component section of the file, including core.xml, document.xml and VBAProject.bin or another programming script. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or userid corporate identity directory but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g. Microsoft's Active Directory. Such embodiments may allow policies to be defined in the directory, e.g. either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g. a dedicated account held by the system that holds the only credentials to sign in to the service. In other embodiments, the client may encrypt the sign on credentials before passing the login to the hosted service, meaning that the networking security system "owns" the password.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parsing or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Parsing extracts metadata values and identifies property groups to be hashed for an incoming file, in some implementations. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1A, system 100 can include any number of cloud-based services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™ Amazon AWS™, Microsoft Office 365™, Workday™, Oracle on Demand™, Taleo™, Yammer™, Jive™, and Concur™.

In the interconnection of the elements of system 100, network 145 couples computers 112a-n, tablets 122a-n, cell phones 132a-n, smart watches 142a-n, cloud-based hosting service 118, web email services 128, video, messaging and voice call services 138, streaming services 148, file transfer services 158, cloud-based storage service 168 and N-CASB 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1A, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used and one or more points of presence (POPs) can be established to implement the security functions. The engines or system components of FIG. 1A are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs is hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112a-n, tablets 122a-n, cell phones 132a-n and smart watches 142a-n in organization network 102.

Computers 112a-n, tablets 122a-n, cell phones 132a-n and smart watches 142a-n in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g. a corporate identities directory such as a Microsoft Active Directory, pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g. read-only vs. read-write.

In addition to periodically generating the user-by-user data and the file-by-file data and persisting it in metadata store 178, an active analyzer and introspective analyzer (not shown) also enforce security policies on the cloud traffic. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246; Cheng, Ithal, Narayanaswamy and Malmskog *Cloud Security For Dummies, Netskope Special Edition,* John Wiley & Sons, Inc. 2015; *"Netskope Introspection"* by Netskope, Inc.; *"Data Loss Prevention and Monitoring in the Cloud"* by Netskope, Inc.; *"Cloud Data Loss Prevention Reference Architecture"* by Netskope, Inc.; *"The 5 Steps to Cloud Confidence"* by Netskope, Inc.; *"The Netskope Active Platform"* by Netskope, Inc.; *"The Netskope Advantage: Three "Must-Have" Requirements for Cloud Access Security Brokers"* by Netskope, Inc.; *"The 15 Critical CASB Use Cases"* by Netskope, Inc.; *"Netskope Active Cloud DLP"* by Netskope, Inc.; *"Repave the Cloud-Data Breach Collision Course"* by Netskope, Inc.; and *"Netskope Cloud Confidence Index™"* by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance, and/or security. In one implementation, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a My SQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Figure 1B:
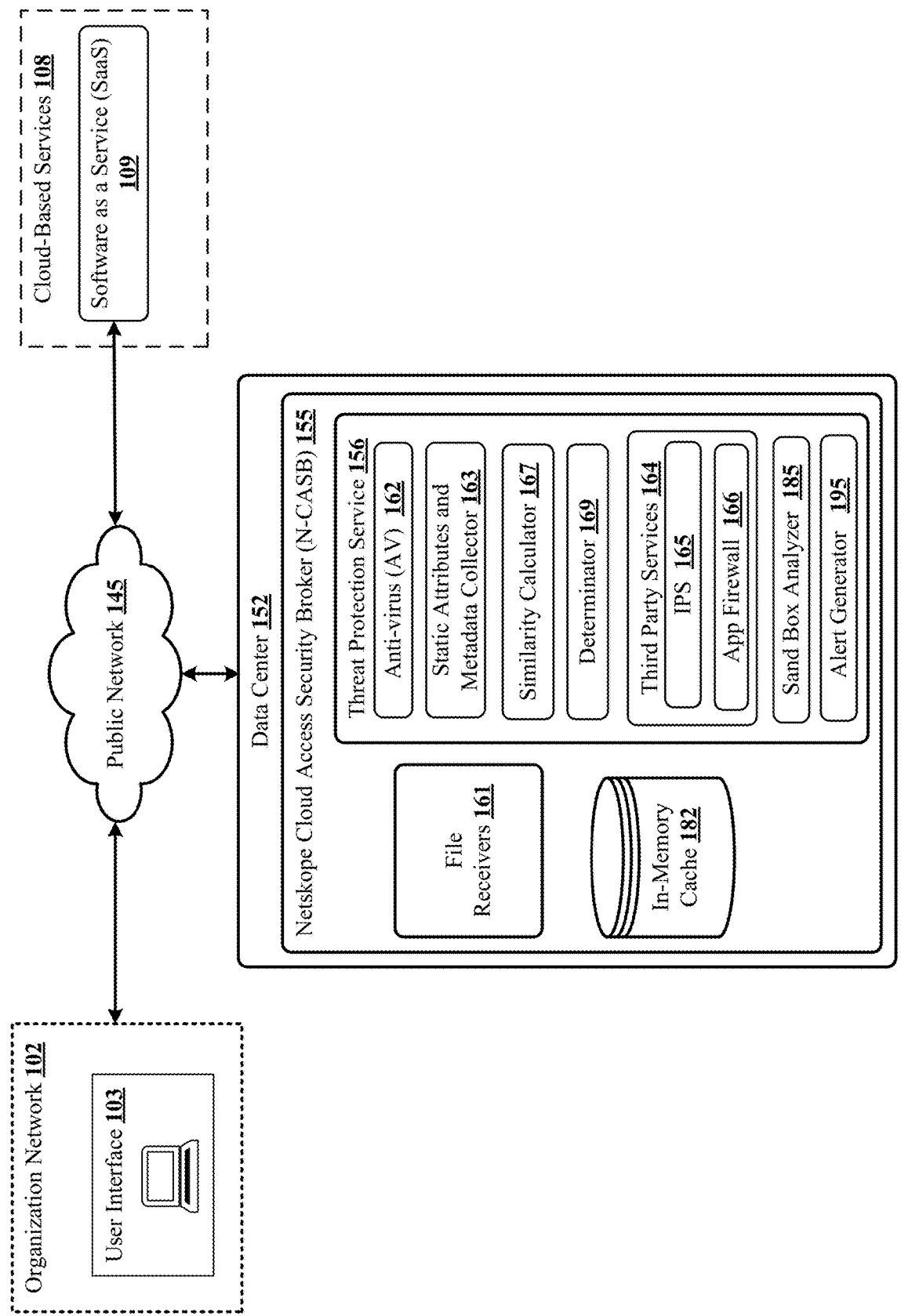
FIG. 1B shows a block diagram for reducing threat detection processing, with organization network, network security system and cloud-based services.

FIG. 1B shows a simplified block diagram for reducing threat detection processing, with organization network 102 with user interface 103 usable by security administrators to interact with the network security system and cloud-based services 108, described relative to FIG. 1A, that include software as a service (SaaS) 109. Data center 152 includes Netskope cloud access security broker (N-CASB) 155 which includes file receivers 161 for managing file traffic; cache 182—a short term, hash indexed, memory based, fast cache that stores the scan result of any file, indexed by the file's hash value; and threat protection service 156, which includes static and dynamic anti-virus inspection 162. Additionally, an entropy calculation is completed each time a new file edit gets saved and static attributes and metadata collector 163 stores the results of parsing, hashing and entropy calculations. Threat protection service 156 also includes similarity calculator 167 for determining the level of similarity between new and old values for file size, file name, file extension and other properties that represent file features. Also included is determinator 169 which utilizes the results of similarity calculator 167 for deciding which files need threat scanning. Malware scanning engines with sandbox analyzers 185 execute files determined to be suspicious and therefore in need of a full threat scan, to test behavior. In one implementation, as much as five minutes may be used to execute each of the executables in the file after scanning. Also included in threat protection service 156 is alert generator 195 for signaling that a file contains malware. One security service is a native service implemented by the security service provider. Third party services 164 include security service app firewall 166 that controls input, output, and access from, to, or by an application, by monitoring and potentially blocking the input, output, or system service calls that do not meet the configured security services policy. In some implementations, the services described as third-party services can be provided by the provider that provides other functions of N-CASB 155. An example app firewall is web application firewall (WAF) for HTTP applications. Yet another security service is intrusion prevention system (IPS) 165 that monitors a tenant's network for malicious activity or policy violations, often using a security information and event management (SIEM) system to collect malicious activity and policy violations centrally. User-by-user data and the file-by-file security data are stored in in-memory data store cache 182. In one implementation, the user-by-user data and the file-by-file data is stored in a semi-structured data format like JSON, BSON (Binary JSON), XML, Protobuf, Avro, or Thrift object, which comprises fields (or columns) and corresponding values of potentially different types like numbers, strings, arrays, and objects.

Figure 2:
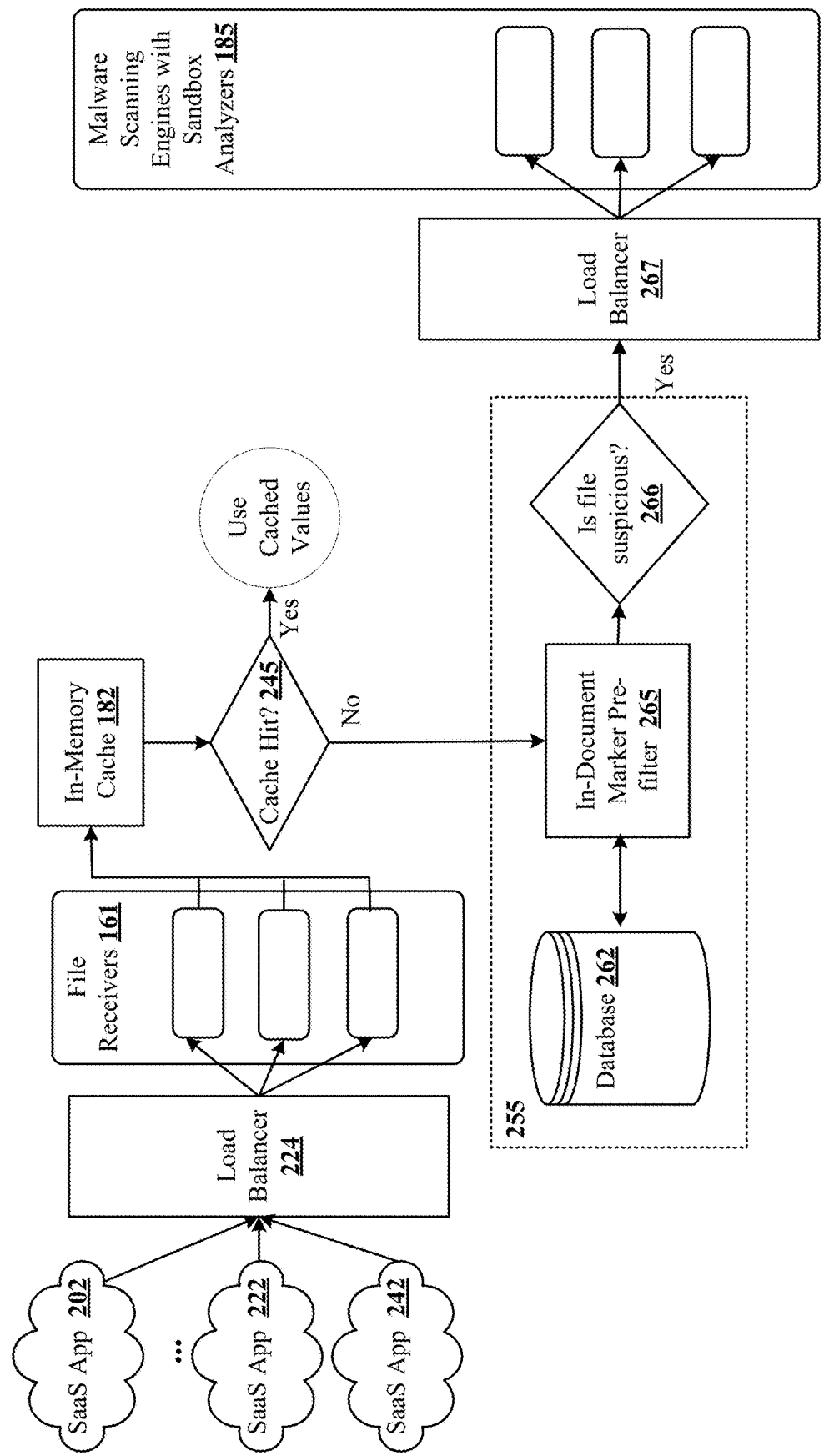
FIG. 2 shows a flow diagram overview for receiving SaaS files and improving threat scanning efficiency for the files.

FIG. 2 shows a flow diagram overview for receiving SaaS files and improving threat scanning efficiency for the files. The disclosed technology applies across a wide range of applications. SaaS apps 202, 222, 242 send cloud-based files to load balancer 224 that distributes the files to file receivers 162 for threat scanning. A first check determines whether the file has been saved previously, so has a file ID and file hash value, and static attributes and meta-information stored in database 262 which utilizes the file ID as the primary key for fetching and inserting records in the future. When an existing file has been edited and saved, the file hash value changes, and the file ID remains the same, because it has been edited inside the same SaaS application, in one example embodiment. In-memory cache 182 is a short term, hash indexed, memory-based, fast cache that stores the scan result of any file, indexed by the file's hash (in one example, MD5) value. Each cache value has configurable TTL (time to live). File receivers 162 use the scan results stored in in-memory cache 182 to decide whether to skip the scanning of the same file if it is received again. That is, if the received file has the same file ID and hash value (MD5) as an existing file in in-memory cache 225 then the check for the received file generates a cache hit 245 and the metadata for the received file can be retrieved from in-memory cache 182. In another example, a SHA2 hash function can be utilized for the file hash. In a third example, an ssdeep hash function computes context triggered piecewise hashes (CTPH), also called fuzzy hashes that can match inputs that have homologies. Such inputs have sequences of identical bytes in the same order, although bytes in between these sequences may be different in both content and length. In some implementations, a locality preserving hash function calculates a hash in which the relative distance between the input values is preserved in the relative distance between of the output hash values. That is, input values that are closer to each other will produce output hash values that are closer to each other.

As the flow diagram of FIG. 2 shows, the disclosed technology determines whether a received file is a newly created file, with a file ID and hash value, that has not been stored in in-memory cache 182 or whether an incoming file has the same file hash value as an existing file scan stored in in-memory cache 182. In one example that shows a cache hit, File A with identifiers (MD5: M1, FileID: F1) arrives at file receivers 162 which will store the file ID and file hash value in cache. Later, File B with identifiers (MD5: M1, FileID: F2) arrives at file receivers 161 and because the hashed value (MD5) is the same (M1) for both files, the cached result can be used; that is, a cache hit is identified. In a second example, this time for a cache miss, File A with file identifiers (MD5: M1, FileID: F1) comes to file receivers 161, which will store the file ID and file hash value in the cache, and store the file's features in database 262. Later, when File B (MD5: M2, FileID: F1) arrives at file receivers 161, a cache miss will occur because File B has a different hash value of M2.

The disclosed technology includes utilizing the features for File B stored in database 262 and fetched by file ID, for determining whether the file has changed enough, as described infra, to warrant threat scanning by malware scanning engines with sandbox analyzers 185 as a security mechanism for mitigating vulnerabilities in incoming files. If the check, via file hash value, for a received file does not generate a cache hit 245, then in-document marker pre-filter 265 reviews the received file to extract features, identifies the in-file markers and stores the feature metadata in database 262, indexed by file ID so that metadata for a later, modified version of the file can be correlated to previously extracted features, as shown in flow diagram 255 and described in detail relative to FIG. 3 infra.

Continuing with the description of the flow overview shown in FIG. 2, for files that are determined to be suspicious 266, load balancer 267 distributes the files to malware scanning engines with sandbox analyzers 185 for full threat scanning for threat detection. Malware scanning engines with sandbox analyzers 185 include static heuristic analysis in which multiple static heuristics about the file are extracted, such individual byte level components and embedded objects, and using the extracted heuristics to determine the maliciousness of the file. Malware scanning engines with sandbox analyzers 185 also include dynamic analysis in which a suspicious file is executed in a contained sandboxed environment and its runtime behavior is captured and used to calculate a score. When the score rises above a configurable threshold, the file is treated as malicious.

Figure 3:
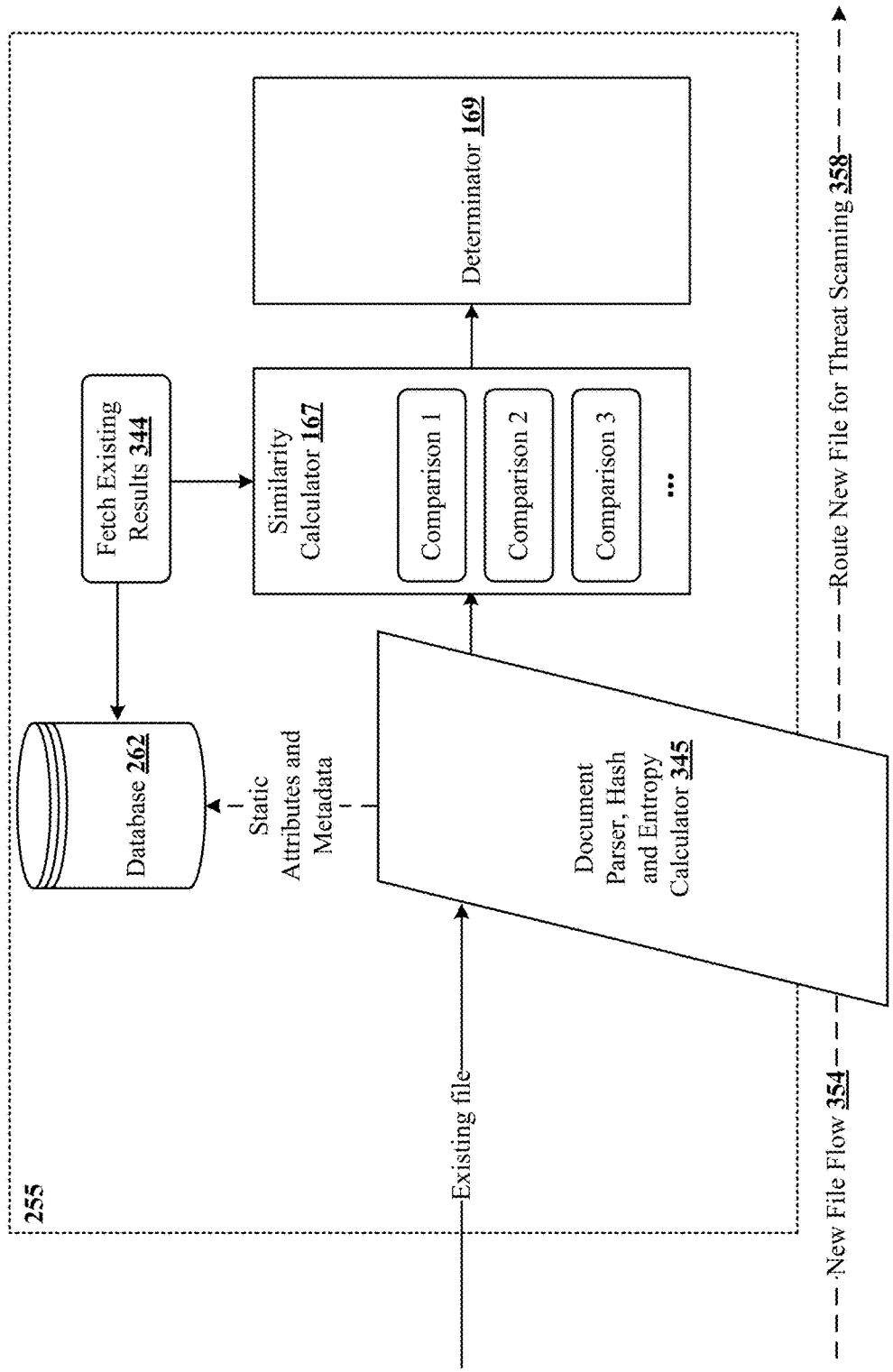
FIG. 3 shows a block diagram, with flow diagram, for reducing threat detection processing for a document file.

FIG. 3 shows a block diagram for reducing threat detection processing for a document file, with flow diagram 255. Newly created files are routed via new file flow 354 to document parser, hash and entropy calculator 345 for the extraction of static attributes and meta-information elements to be utilized in the future, for determining whether full threat scanning is warranted, for the edited version of a previously processed file. Identified static attribute and metadata elements are stored in database 262 using the file ID as primary key, along with the unique calculated hash for storing and accessing the file data. The new file, along with static attributes and metadata, is routed for threat scanning 358 and the full scan results are stored for future reference. For files that result in a cache hit 245, in-memory cache can be examined to learn whether the file has been seen before, and if yes, analyzing the changes to learn whether the changes warrant a full threat scan.

A measure of randomness of data inside a file can be tracked by calculating entropy each time a new file edit happens. The well-known Shannon Entropy calculation for calculating the file's entropy is utilized, in Python, in one implementation of the disclosed technology. Gradual change in entropy means that the data has largely remained in the same structure as before. A sudden change in entropy signifies that the structure as well as the content has changed altogether. For example, for an array that contains the most recent four entropies of a file: [2.33, 2.39, 2.46, 5.7], the series of values shows that the entropy has gradually increased except in the case of the last value. In the example, the high increase in entropy number in the last edit denotes a potential malicious behavior as it is deviating from the normal. This can be an indication of an attack such as Ransomware which encrypts the files on a user's system, which drastically increases the randomness of the content, thus changing its entropy.

Continuing with the description of the flow diagram of FIG. 3, when an existing file with file ID is received, the disclosed system fetches the existing results 344 as static attributes and metadata for the previous version of the file identified by the existing file ID from database 262. Document parser, hash and entropy calculator 345 parses the current document file and calculates the hash and the entropy. Static attributes and metadata are stored in database 262, including date, file name and file extension, and metadata in one example, indexed by file ID and hash. Similarity calculator 167 compares data collected for this version of the existing file to component data for a set of previous versions of the file with the same file ID but different file hash values. Four to five previous edit records are retained for correctly predicting the rate of changes, in one implementation. In another implementation a different number of previous edit records may be retained and compared. Multiple comparisons of various components of metadata can generate multiple similarity results, such as for file size changes, filename changes, file extension changes and other components of saved documents, as described in examples infra.

The disclosed similarity calculator 167 utilizes multiple types of similarity calculations. In one type, similarity calculator 167 calculates the similarity between numbers such as "entropy of file" and "file size", as the difference between the new and the old values. Consider the earlier example entropy array [2.33, 2.39, 2.46, 5.7]. A simple entropy similarity score calculation example between first and second edit of the file is: 100−((2.39−2.33)/2.33*100) which is ~97.5. The similarity percentage means that the files are 97.5% similar before and after edits. The disclosed similarity calculator 167 uses a second type of similarity calculation for calculating the similarity between non-numeric factors such as file name, file extension, section of the file such as core.xml, and programming script, in one implementation. In one example, for file names and extensions cases, similarity calculator 167 utilizes the Levenshtein distance, which measures the similarity between two strings using the Python library called Levenshtein strings and calling the Levenshtein ratio function to get the similarity score between two filenames. For two filenames: testfile_20190101.docx and testfile_20190102.docx, the similarity percentage calculated for the file names is ~96% similar and the extensions are 100% similar which means no change between before and after edits.

For calculating the similarity between different sections of the file, such as document.xml or core.xml, similarity calculator 167 utilizes the results of document parser, hash and entropy calculator 345 that calculates the hash of the section of the file using Python Hashlib library which contains ssdeep hashing capability and the ssdeep compare function for computing the similarity between two ssdeep hashes, in one implementation. In this case, document parser, hash and entropy calculator 345 calculates the ssdeep hash of various file sections before edit for comparison with the ssdeep hash values of the same sections after edits, to predict the amount of change and the section in which change occurred. Similarity calculator 167 compares how similar the hashes are with each saved version of the file with the same file ID. Determinator 169 considers similarity hash values for sections of the file, metadata hash values for changed metadata, as well as file attributes such as number of characters and number of words in a file. A configurable similarity score threshold can be utilized by determinator 169 in one implementation of disclosed similarity calculator 167. FIG. 5 and FIG. 6 show example metadata for a file, along with similarity hash results for file property groups, as described infra.

FIG. 4A shows an example document object model (DOM) tree structure with various property groups accessible for a file. Core properties 412 include metadata such as the number of words in the file, the author of the file, and a meta-property that is active when a document includes a link, for example. Document 416 holds the actual text of the file and programming script 428 includes information about visual basic, macros and links embedded in the file. In one case, if too many characters are added or a new link is added, a new complete threat scan is warranted to protect the customer from malware. In one example, programming script 428 can be VBAProject.bin that includes a compressed form of a visual basic programming script.

FIG. 4B shows an example of file property groups 445 for a file, with core properties core.xml 455, application properties App.xml 465 of the application in which the file was created, edited and saved. Main document content document.xml 475 contains the body of the document file. VBA script in compressed form VBAProject.bin 485 will be present if macros or other JavaScript are present in the file. In another example, a programming script can be a bound script attached to a G Suite document or a script embedded and represented in application properties for a document.

Threat protection service 156 utilizes static attributes and metadata collector 163, similarity calculator 167 and determinator 169 for analyzing aspects of the file for determining whether an updated file needs a full threat scan after being changed, as described next. Document parser hash and entropy calculator 345 extracts and stores the file and application metadata values, including word count, character count and paragraph count and author; and calculates and stores the ssdeep hash of each section of the file structure of the document file: core.xml 455, app.xml 465, document.xml 475 and programming script 485, which can be compressed as VBAProject.bin, in one implementation. Additional measurements can be implemented for other types of files. In another embodiment, programming scripts may be represented by a different set of metadata values instead of VBAProject.

If the file has been last scanned beyond the configurable day range, then the file is sent through complete scanning and is treated as a new file flow 354. The following checks are completed, in one embodiment. The date when the file was last scanned is checked and stored. If the file was most recently scanned more than a configurable number of days earlier, then the complete file needs full threat scanning. If the file has been scanned within the required configurable number of days, then the in-doc marker pre-filter 265 decides whether the file needs full threat scanning. Document parser and entropy calculator 345 computes the entropy for the updated file, and similarity calculator 167 computes the similarity between the file's entropy and its previous entropies, to ensure that the randomness of data has remained consistent over time, and to provide an estimate of the amount of new data added in the document. Next, the file's size is compared to the size of previous edits. If the file size change is within a configurable threshold, the file edits are accepted as benign. Configurable threshold values can be adjusted as more data is collected and analyzed, to reduce threat detection processing.

The analysis continues by considering the hash of sections of the document file, to locate what new data has been added. If the ssdeep hash of main document content document.xml 475 changes, it indicates that the text of the file has been changed—adding to or modifying existing text. Similarity calculator 167 calculates the similarity between the previous and current ssdeep hash value score between the previous and current file. If these values fall within a configurable range, it signifies that the document likely received additional text. Determinator 169 calculates changes in additional file properties, including word count, character count and paragraph count, to further make a positive assertion that additional text and/or whitespaces have been added. This conclusion pertains to a normal document edit, when the values are within the configurable threshold. In one case in which document text grows by a large number, for example an increase from 3000 to 50000 for the word count, the ssdeep hash of the document.xml sections will considerably differ along with other noticeable differences like changes in word and paragraph counts. If the ssdeep hash of a programming script, such as VBAProject.bin or Script, changes or gets introduced, this implies that the current file edit resulted in changed or added new macro code inside the file, which indicates a suspicious edit and that generates a trigger for a full scan of the file. Determinator 169 uses the results of the analysis described to decide whether to send the updated file for complete threat scanning.

FIG. 5 lists example metadata values usable for analyzing the similarity between properties of the edited version of a document file and the previously processed file, with features and property groups that represent the file, as described relative to the DOM shown in FIG. 4A. For example, the application and app version 502 are listed as metadata values of the document, as is the number of characters 522 and the document creator 532. FIG. 6 shows the second portion of example metadata with additional document metadata values and similarity hash changes for the file. Entropy change 612 over the three file saves is shown as a percentage. Filename similarity score 622 shows 95.4 percent similarity for the filenames that have only a single digit date change from file save to file save. The file extension is identical for the three file saves, as docx, so the similarity score for file extension 632 is 100% as one may expect. The size of the file almost doubled from file save two to file save three, which resulted in a 92.2% change 642. Similarity scores are listed for app.xml 652, core.xml 662 and document.xml 672 property groups. Note that the similarity scores are 99%, 91%, and 91% for the second file save, but 86%, 86% and 0% respectively for the three property groups for the third file save. The edited file warrants a new threat scan, based on these calculations.

FIG. 7 shows an example of analysis results of property groups for a scenario in which a macro has been added to the edited version of the file that was not present in the previously processed files. The result file shows no macro inside the file for the first two edits of the file, and shows that a macro was added in the third edit, as reported via vba_macro field values of false, false and true 782. The vba_macro field is utilized as a heuristic check. Addition of a macro is a suspicious behavior and the file would need to go through complete threat scanning. The similarity score was 0 for the first file save since there was no comparison point. The similarity score in the second case is 100 since there is no macro. The third edit gets a new hash value for macro and the similarity drops to 0 again, as shown in the field value for similarity_score 776, Similarity scores are 99% and 91% 756 for app.xml for the second and third file saves, respectively. Determinator 169 decides to send the file to threat scanning due to the addition of a macro to the file.

FIG. 8A shows analysis results for another example, in which threat protection service 156 determines that there has been a change in a file's extension 864 with the file extension changing altogether and flags the anomaly so the file gets routed for full threat scanning. Note that there was a slight change in file's name 836 as well. File name change similarity calculation 845 shows the file names are 95.4% similar at the second save and only 84% similar at the third save. This level of similarity is well within a range expected, except that the file's extension changed altogether, so a threat scan is warranted in such case. Also notice the drastic change in entropy 824 that indicates a possibility of ransomware attack, in which the file has been encrypted, leading to drastic change in entropy and also the file's extension change to a new weird extension, both behaviors which are indicators for ransomware type attacks. This file would definitely be routed for detailed threat scan, as its extension has changed as well as its entropy, as relevant indicators.

FIG. 8B shows another snippet of analysis results for a series of saves for a file. In this case an added hyperlink 878 is included in the document properties. New URL 878 being added to the document points to potential suspicious activity. The URL needs to be checked for its reputation and possible malicious content along with scanning the complete document through complete scan. Also note that the filename 886 has completely changed from the previous filename, which warrants a complete threat scan.

The analysis results files described relative to FIG. 5 through FIG. 8B exemplify analysis examples for reducing threat protection processing needed for network delivered cloud and web services that optimize the threat scanning process by scanning a file once and re-scanning its edits only if the new changes reach a configurable threshold value. A workflow for reducing threat protection processing is described next.

Workflow

FIG. 9 shows a representative method of reducing threat protection processing. Flowchart 900 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to a system which includes Netskope cloud access security broker (N-CASB).

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 9 begins with action 915 recognizing that a file is an edited version of a previously processed file.

Process 900 continues at action 925 with retrieving, from an archive, metadata values, an entropy measure and hashes for property groups of the previously processed file.

Action 935 includes parsing the file into metadata values and property groups, taking into account format of the file, and calculating the hashes of the property groups and an entropy measure for the file.

Action 945 includes applying similarity measures to compare the metadata values, the entropy measures, and the hashes on property groups, for the edited version and the previously processed file.

At action 955, when any similarity measure or combination of similarity measures reaches a trigger, processing the file by using a threat detection module to detect malware.

Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

Computer System

Figure 10:
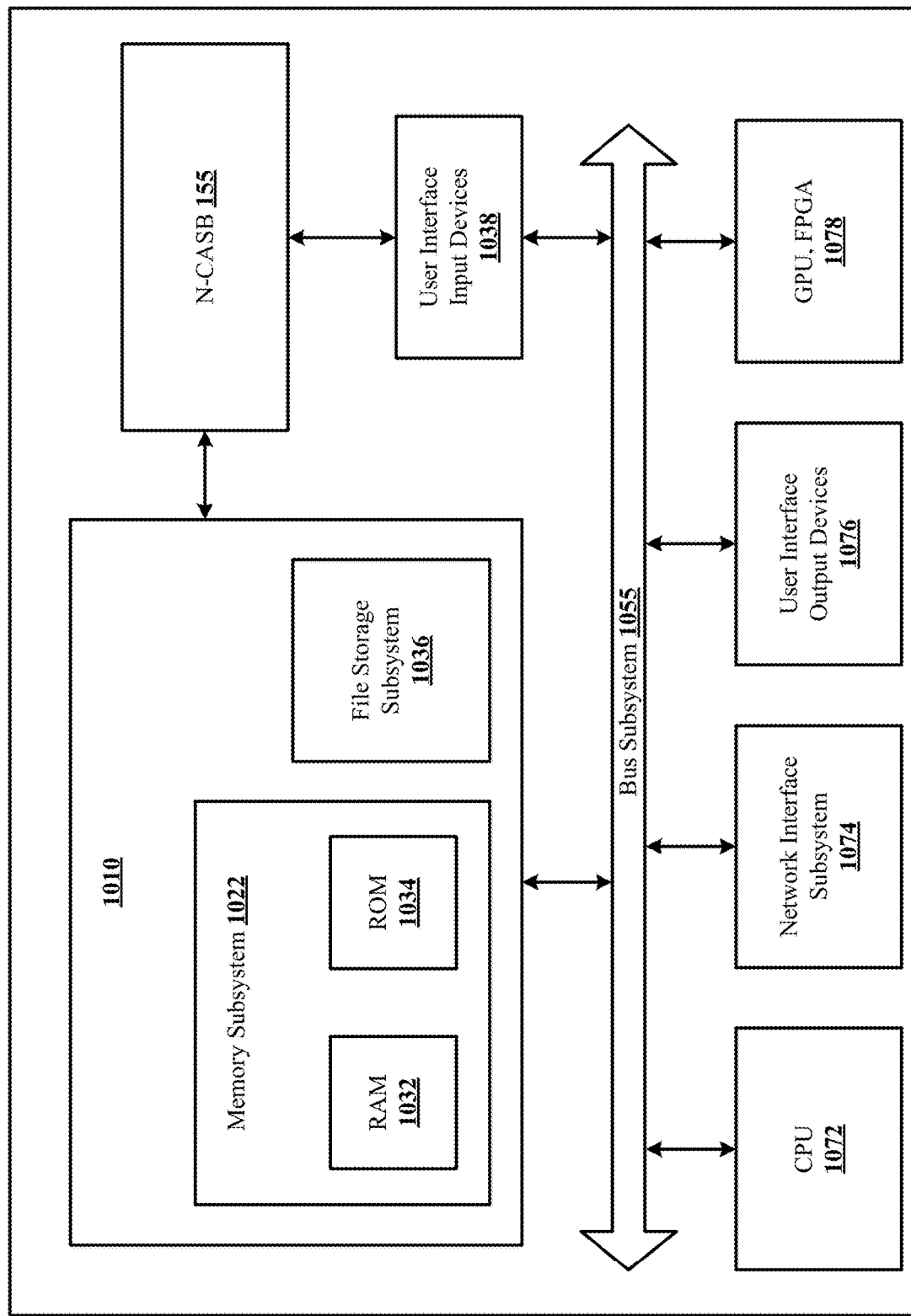
FIG. 10 illustrates a simplified block diagram of a computer system that can be used for reducing threat protection processing, according to one embodiment of the disclosed technology.

FIG. 10 is a simplified block diagram of a computer system 1000 that can be used for reducing threat protection processing. Computer system 1000 includes at least one central processing unit (CPU) 1072 that communicates with a number of peripheral devices via bus subsystem 1055, and Netskope cloud access security broker (N-CASB) 155 for providing network security services described herein. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, Netskope cloud access security broker (N-CASB) 155 of FIG. 1A and FIG. 1B is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

Particular Implementations

Some particular implementations and features for reducing threat detection processing are described in the following discussion.

In one disclosed implementation, a method of reducing threat detection processing includes recognizing that a file is an edited version of a previously processed file and retrieving, from an archive, metadata values, an entropy measure and hashes for property groups of the previously processed file. The method also includes parsing the file into metadata values and property group, taking into account format of the file, and calculating hashes of the property groups and an entropy measure for the file. Further, the disclosed method includes applying similarity measures to compare the metadata values, the entropy measures, and the hashes on property groups, for the edited version and the previously processed file, and avoiding full threat scanning of the file to detect malware except when a similarity measure or a combination of the similarity measures reaches a scanning trigger.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the disclosed method further includes logging the edited version of the file for further processing when the similarity measure or the combination of the similarity measures reaches a logging trigger. Another implementation includes performing a full threat scanning of the edited version of the file when the similarity measure or the combination of the similarity measures reaches the scanning trigger.

For some implementations of the disclosed method, the hashes for the property groups of the edited version and the previously processed file are locality preserving hashes. In one implementation, the hashes for the property groups of the edited version and the previously processed file are fuzzy hashes.

For some implementations of the disclosed method, the metadata values include file size for the edited version of the file and for the previously processed file, date for the edited version of the file and date when the previously processed file was last scanned, and file name and file extension for the edited version of the file and for the previously processed file.

In one implementation of the disclosed computer-implemented method, the metadata values include file size for the edited version of the file and for the previously processed file.

For some implementations of the disclosed method, the property groups for the edited version of the file and for the previously processed file include core properties of the file, application properties, main document content and programming scripts. Some implementations further include calculating and storing a hash for each property group for the edited version of the file: core properties of the file, application properties, main document content and programming scripts.

Some implementations of the disclosed method further include applying the similarity measures to more than one version of the previously processed file. In some implementations of the disclosed computer-implemented method, the triggers for the similarity measures are configurable values.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of reducing threat detection processing, including:
   recognizing that a file is an edited version of a previously processed file;
   retrieving, from an archive, metadata values and an entropy measure for the previously processed file;
   parsing the file into metadata values and property groups, taking into account format of the file, and calculating an entropy measure for the file;
   applying similarity measures to compare the metadata values and the entropy measures for the edited version and the previously processed file; and
   avoiding full threat scanning of the file to detect malware except when a similarity measure or a combination of the similarity measures reaches a scanning trigger.

2. The computer-implemented method of claim 1, further including retrieving, from an archive, hashes for property groups of the previously processed file;
   calculating the hashes of the property groups for the file;
   applying similarity measures to compare the hashes on property groups, for the edited version and the previously processed file; and
   avoiding full threat scanning of the file to detect malware except when a similarity measure or a combination of the similarity measures reaches a scanning trigger.

3. The computer-implemented method of claim 2, wherein the hashes of the properties of the edited version and the previously processed file are locality preserving hashes.

4. The computer-implemented method of claim 2, wherein the hashes of the properties of the edited version and the previously processed file are fuzzy hashes.

5. The computer-implemented method of claim 2, further including calculating and storing a hash for each property group for the edited version of the file: core properties, application properties, main document content and programming scripts.

6. The computer-implemented method of claim 1, further including logging the edited version of the file for further processing when the similarity measure or the combination of the similarity measures reaches a logging trigger.

7. The computer-implemented method of claim 1, further including performing a full threat scanning of the edited version of the file when the similarity measure or the combination of the similarity measures reaches the scanning trigger.

8. The computer-implemented method of claim 1, wherein the metadata values include:
   file size for the edited version of the file and for the previously processed file;
   date for the edited version of the file, and date when the previously processed file was last scanned; and
   file name and file extension for the edited version of the file and for the previously processed file.

9. The computer-implemented method of claim 1, wherein the metadata values include file size for the edited version of the file and for the previously processed file.

10. The computer-implemented method of claim 1, wherein the property groups of the edited version of the file and for the previously processed file include core properties, application properties, main document content and programming scripts.

11. The computer-implemented method of claim 1, further including applying the similarity measures to more than one version of the previously processed file.

12. A tangible non-transitory computer readable storage media, including program instructions loaded into memory that, when executed on processors cause the processors to implement actions for reducing threat detection processing, the actions including:
 recognizing that a file is an edited version of a previously processed file;
 retrieving, from an archive, metadata values and an entropy measure for the previously processed file;
 parsing the file into metadata values and property groups, taking into account format of the file, and calculating an entropy measure for the file;
 applying similarity measures to compare the metadata values and the entropy measures for the edited version and the previously processed file; and
 avoiding full threat scanning of the file to detect malware except when a similarity measure or a combination of the similarity measures reaches a scanning trigger.

13. The tangible non-transitory computer readable storage media of claim 12, the actions further including logging the edited version of the file for further processing when the similarity measure or the combination of the similarity measures reaches a logging trigger.

14. The tangible non-transitory computer readable storage media of claim 12, the actions further including performing a full threat scanning of the edited version of the file when the similarity measure or the combination of the similarity measures reaches the scanning trigger.

15. The tangible non-transitory computer readable storage media of claim 12, wherein the metadata values include:
 file size for the edited version of the file and for the previously processed file;
 date for the edited version of the file, and date when the previously processed file was last scanned; and
 file name and file extension for the edited version of the file and for the previously processed file.

16. The tangible non-transitory computer readable storage media of claim 12, wherein the metadata values include file size for the edited version of the file and for the previously processed file.

17. The tangible non-transitory computer readable storage media of claim 12, the actions further including retrieving, from an archive, hashes for property groups of the previously processed file;
 calculating the hashes of the property groups for the file;
 applying similarity measures to compare the hashes on property groups, for the edited version and the previously processed file; and
 avoiding full threat scanning of the file to detect malware except when a similarity measure or a combination of the similarity measures reaches a scanning trigger.

18. A system for reducing threat detection processing, the system including a processor, memory coupled to the processor and computer instructions from the non-transitory computer readable storage media of claim 12 loaded into the memory.

19. The system of claim 18, the actions further including applying the similarity measures to more than one version of the previously processed file.

20. The system of claim 18, the actions further including retrieving, from an archive, hashes for property groups of the previously processed file;
 calculating the hashes of the property groups for the file;
 applying similarity measures to compare the hashes on property groups, for the edited version and the previously processed file; and
 avoiding full threat scanning of the file to detect malware except when a similarity measure or a combination of the similarity measures reaches a scanning trigger.

21. The system of claim 20, wherein the hashes for the properties of the edited version and the previously processed file are locality preserving hashes.

22. The system of claim 20, the actions further including calculating and storing a hash for each property group for the edited version of the file: core properties, application properties, main document content and programming scripts.

* * * * *